(12) United States Patent
Mori et al.

(10) Patent No.: US 7,136,245 B2
(45) Date of Patent: Nov. 14, 2006

(54) DISK DEVICE

(75) Inventors: Kazunori Mori, Kawasaki (JP); Isamu Tomita, Kawasaki (JP); Takeyori Hara, Kawasaki (JP); Yoshiyuki Kagami, Kawasaki (JP); Kouhei Takamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 37 days.

(21) Appl. No.: 10/897,759

(22) Filed: Jul. 23, 2004

(65) Prior Publication Data
US 2005/0190480 A1 Sep. 1, 2005

(30) Foreign Application Priority Data
Feb. 27, 2004 (JP) .............................. 2004-052959

(51) Int. Cl.
G11B 5/09 (2006.01)
G11B 19/04 (2006.01)
G11B 5/596 (2006.01)

(52) U.S. Cl. ...................... 360/53; 360/60; 360/77.02; 360/78.04; 360/39

(58) Field of Classification Search .................... None
See application file for complete search history.

(56) References Cited

U.S. PATENT DOCUMENTS
6,587,302 B1 * 7/2003 Ahn ........................ 360/77.04
2005/0068650 A1 * 3/2005 Annampedu et al. ......... 360/39

FOREIGN PATENT DOCUMENTS
JP 11-120720 4/1999

* cited by examiner

Primary Examiner—Andrew L. Sniezek
(74) Attorney, Agent, or Firm—Greer, Burns & Crain,Ltd.

(57) ABSTRACT

A disk device performs position control of a head. An acquiring unit acquires correction information and check information from a disk for checking the correction information. A judging unit judges whether the correction information acquired should be used for correcting position information recorded in the disk, based on the correction information acquired and the check information acquired.

6 Claims, 10 Drawing Sheets

FIG.8

ALLOWABLE SLICE
WIDTH TABLE

| ERROR FREQUENCY | ALLOWABLE SLICE WIDTH |
|---|---|
| 0 | -15% TO 15% |
| 1 TO 5 | -10% TO 10% |
| MORE THAN 5 | -5% TO 5% |

DISK DEVICE

BACKGROUND OF THE INVENTION

1) Field of the Invention

The present invention relates to a disk device that performs accurate position control of a head of a recording device.

2) Description of the Related Art

A conventional disk device that is used as an external recording device for a computer moves a head to a target track on a rotating disk surface to record and reproduce data.

However, servo information to be used for position control is not recorded on the track in a completely circular shape, and hence, accurate position control of the head cannot be performed. Thus, it is likely that data is written in a position different from the target track by mistake.

Therefore, a head positioning control device disclosed in Japanese Patent Application Laid-Open Publication No. H11-120720 creates correction information for correcting head position information, records the created correction information in a servo information area on a disk, and at the time of positioning an actual head, reads out the correction information to correct a position error signal for the actual head, and uses the corrected position error signal to perform positioning for the head to thereby correct a constant position error.

However, the conventional technique has a problem in that the correction information for each servo frame cannot be read accurately.

Therefore, when wrong correction information is read from a track, the position of the head is corrected to a wrong position. Writing data in the wrong position may destroy data or may cause data garbling.

In other words, it is extremely important to use accurate correction information corresponding to position information included in servo information, to thereby perform position control of a head and improve accuracy of the position control for the head.

SUMMARY OF THE INVENTION

It is an object of the invention to at least solve the problems in the conventional technology.

A disk device according to an aspect of the present invention performs position control of a head. The disk device includes an acquiring unit that acquires correction information and check information from a disk for checking the correction information; and a judging unit that judges whether the correction information acquired should be used for correcting position information recorded in the disk, based on the correction information acquired and the check information acquired.

A disk device according to another aspect of the present invention performs position control of a head. The disk device includes a judging unit that judges whether correction information should be used for correcting position information based on a magnitude of a change in the correction information. The position information is stored in frames provided at predetermined intervals along a circumferential direction on a disk, and the correction information is generated such that a magnitude of a change in the correction information of frames adjacent to each other is within a predefined allowable range.

A method according to still another aspect of the present invention is a method for performing position control of a head for performing position control of a head. The method includes acquiring correction information and check information from a disk for checking the correction information; and judging whether the correction information acquired should be used for correcting position information that is recorded in the disk, based on the correction information acquired and the check information acquired.

A computer program according to still another aspect of the present invention realizes the method according to the present invention on a computer.

A computer-readable recording medium according to still another aspect of the present invention stores therein the computer program according to the present invention.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 8 illustrates an example of an allowable slice width table;

DETAILED DESCRIPTION

Exemplary embodiments of a disk device according to the present invention are explained in detail below with reference to the accompanying drawings.

Figure 1:
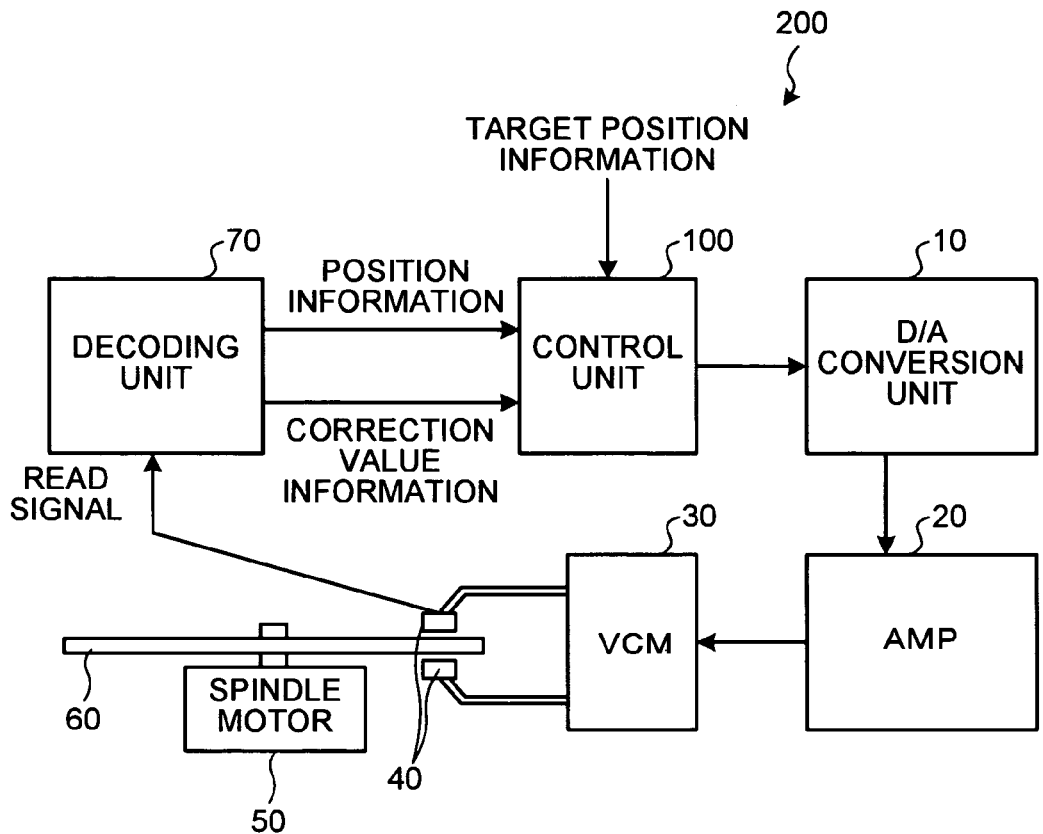
FIG. 1 is a functional block diagram of a disk device according to the present invention.

FIG. 1 is a functional block diagram of a disk device according to the present invention. A disk device 200 includes a D/A conversion unit 10, an amplifier (AMP) 20, a voice coil motor (VCM) 30, a head 40, a spindle motor 50, a magnetic disk 60, a decoding unit 70, and a control unit 100.

The D/A conversion unit 10 converts a digital drive signal sent by the control unit 100 into an analog drive signal, and sends the analog drive signal to the AMP 20. The drive signal causes the head 40 to follow a target track. The AMP 20 amplifies the drive signal received from the D/A conversion unit 10 and sends the amplified drive signal to the VCM 30.

Figure 2:
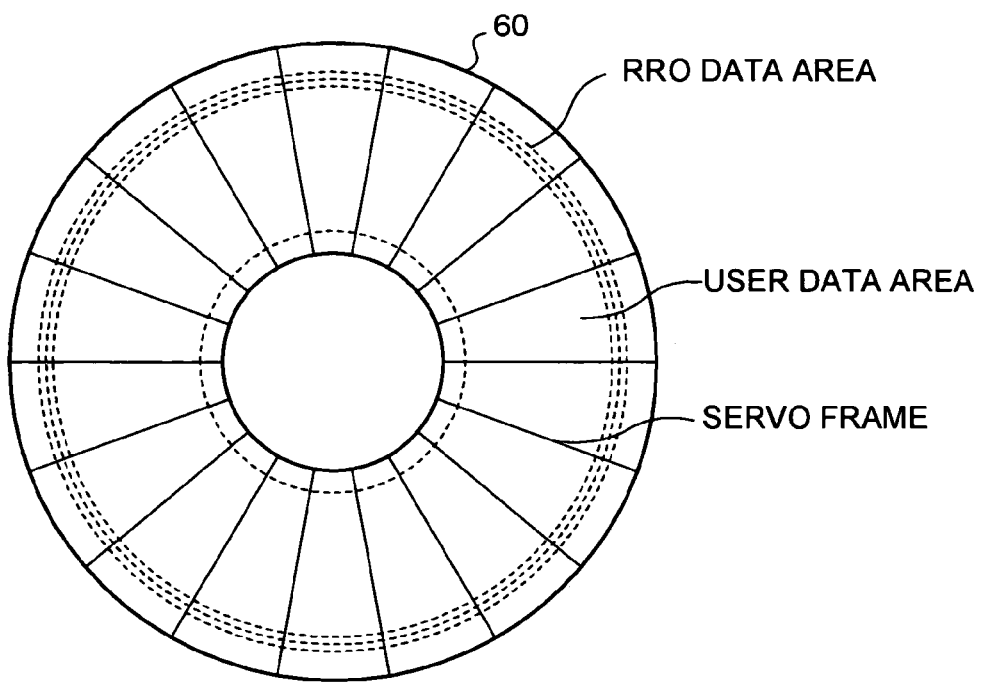
FIG. 2 illustrates a magnetic disk.

The VCM 30 receives the drive signal from the AMP 20 and moves the head 40 to a position of the target track on the magnetic disk 60 based on the drive signal received. As shown in FIG. 2, the magnetic disk 60 includes user data areas and repeatable run out (RRO) data areas. The user data areas and the RRO data areas include servo frames.

The servo frames include information such as position information and correction value information. The user data areas are used for recording general information. The position information informs the head 40 of a present position, and the correction value information is used for correcting the position information.

An example of use of the RRO data areas is when the information recorded in the servo frames of the user data area is not read accurately. The RRO data areas contain RRO data that includes position information, correction information, and the like for the servo frames of the respective user data areas.

If the correction value information is not read correctly from the servo frames during on-track control in the user data areas, the disk device use the correction value information stored in the RRO data areas to perform position control for the head 40 appropriately.

Figure 3:
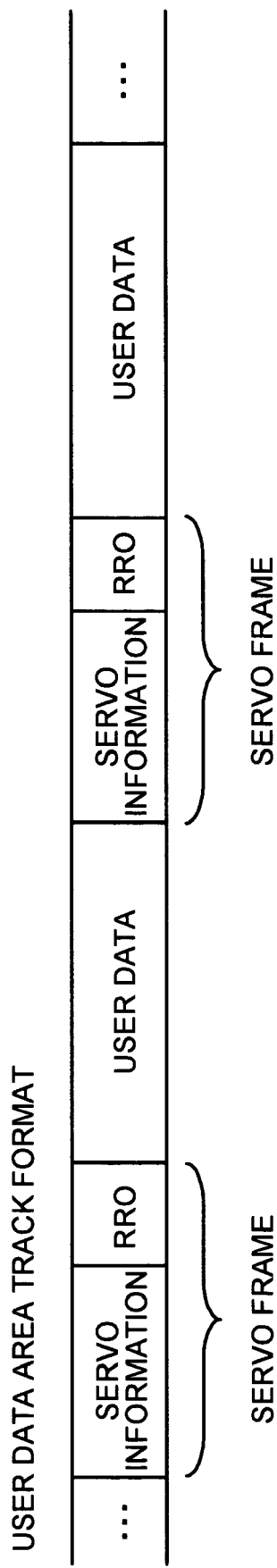
FIG. 3 illustrates a track format of a user data area.

FIG. 3 illustrates a track format of the user data area. The track format of the user data area has servo frames that include servo information and RRO, and user data that is general information. Further, the servo information includes position information, and the RRO includes correction value information.

Figure 4:
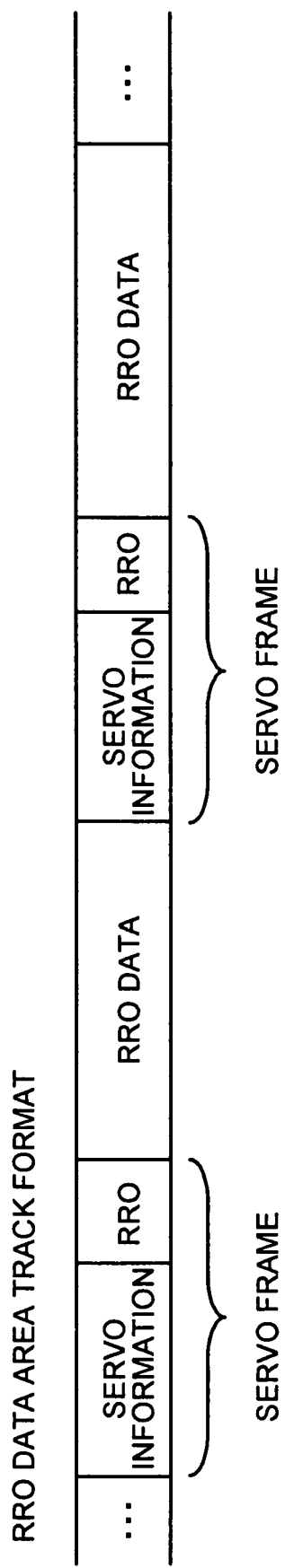
FIG. 4 illustrates a track format of a repeatable run out (RRO) data area.

FIG. 4 illustrates a track format of the RRO data area. The track format of the RRO data area has servo frames that include servo information and RRO, and RRO data that includes position information and correction value information corresponding to the servo frames included in the respective user data areas.

The head 40 reads information in the servo frames recorded in the track of the magnetic disk 60 and sends the information read to the decoding unit 70 as a read signal. The spindle motor 50 rotates the magnetic disk 60 at a constant rotation speed.

The decoding unit 70 receives the read signal from the head 40, decodes the read signal into the position information and the correction value information, and sends the decoded position information and correction value information to the control unit 100.

The control unit 100 receives target position information from an external device (not shown), and the position information and the correction value information from the decoding unit 70. The control unit 100 uses the correction value information to correct the position information and create corrected position information.

Then, the control unit 100 sends a drive signal, for eliminating an error between the corrected position information and the target position information, to the D/A conversion unit 10. Note that, as described later, the control unit 100 judges whether the correction value information is appropriate, and uses the correction value information received from the decoding unit 70 only if it is judged that the correction value information is appropriate.

A structure of the control unit 100 shown in FIG. 1 will be explained next, with reference to the functional block diagram in FIG. 5. The control unit 100 includes a temporary storage unit 110, a correction information processing unit 120, a servo control unit 130, and a memory 140.

Figure 6:
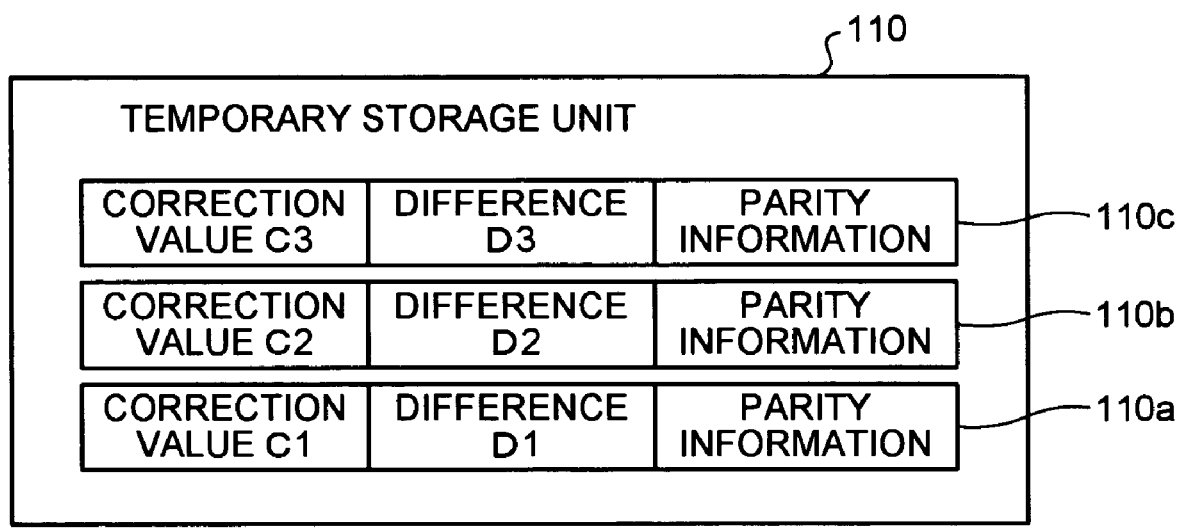
FIG. 6 illustrates a specific structure of a temporary storage unit.

The temporary storage unit 110 sequentially stores pieces of correction value information sent by the decoding unit 70. FIG. 6 illustrates a specific structure of the temporary storage unit 110. The temporary storage unit 110 includes first correction value information 110a, second correction value information 110b, and third correction value information 110c. Note that, here, for convenience of explanation, the first correction value information, the second correction value information, and the third correction value information are shown in the temporary storage unit 110. However, the pieces of correction value information to be stored in the temporary storage unit 110 are sequentially updated every time the position information, which is an object of correction, changes.

The first correction value information 110a includes a correction value C1, a difference D1, and parity information for the correction value C1 and the difference D1. The second correction value information 110b includes a correction value C2, a difference D2, and parity information for the correction value C2 and the difference D2. The third correction value information 110c includes a correction value C3, a difference D3, and parity information for the correction value C3 and the difference D3.

The respective correction values are used for correcting corresponding position information. The relation between the correction values and the differences is such that a difference between the correction value C1 and the correction value C2 is the difference D1, and a difference between the correction value C2 and the correction value C3 is the difference D2.

Note that, if the relations among the correction values and the differences do not hold true, this means that correction value information was not read from the magnetic disk accurately. Moreover, the respective pieces of parity information are used to judge whether a correction value and a corresponding difference are read accurately.

Figure 7:
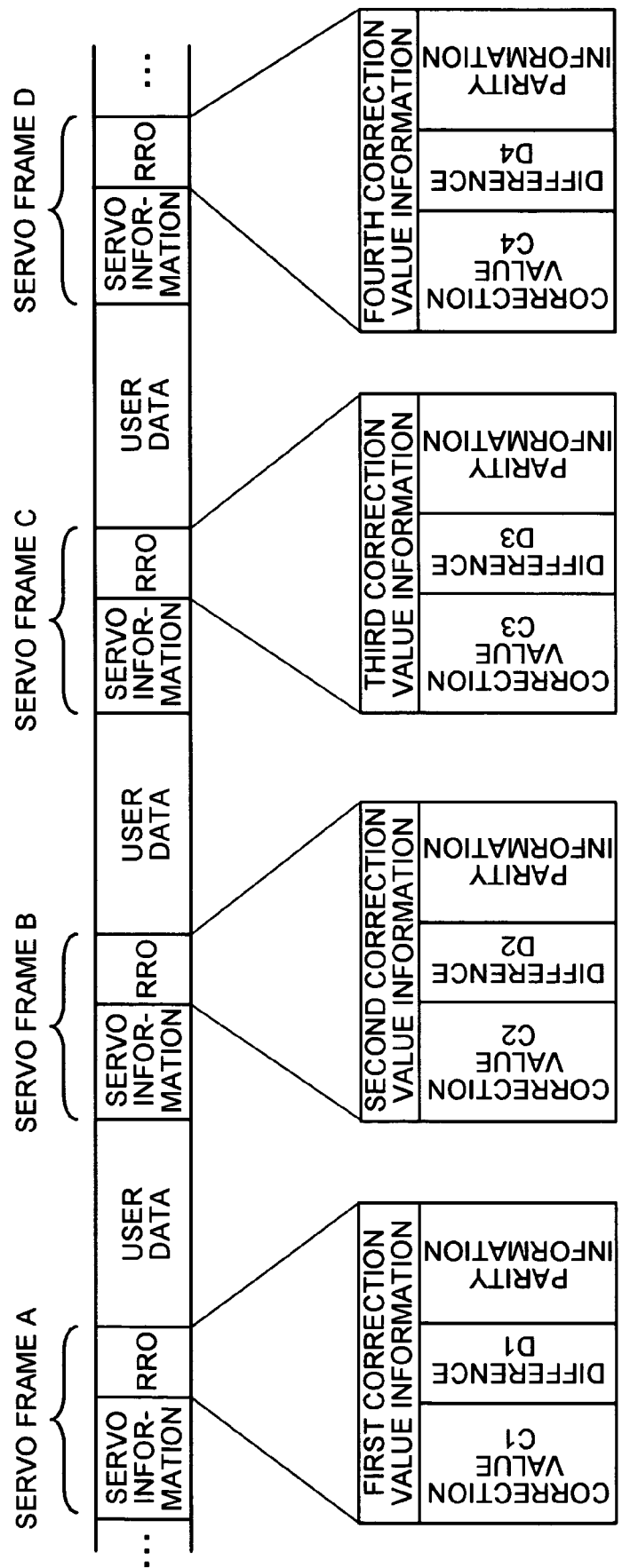
FIG. 7 illustrates a positional relation among first correction value information, second correction value information, and third correction value information.

A positional relation recorded on a track with respect to the first correction value information 110a, the second correction value information 110b, and the third correction value information 110c will be explained next, with reference to FIG. 7. The correction value information are recorded in an immediately preceding servo frame with respect to the corresponding position information.

More specifically, the second correction value information 110b for correcting position information included in a servo frame C is recorded in an immediately preceding servo frame B. Similarly, the first correction information 110a for correcting position information included in the servo frame B is recorded in a servo frame A.

The third correction value information 110c for correcting position information included in a servo frame D is recorded in the servo frame C. Note that the head 40 reads the position information and the correction value information sequentially, starting from the servo frame A.

Therefore, at a point when the head 40 has read the position information and the correction value information in the servo frame C, the first correction value information 110a, the second correction value information 110b, and the third correction value information 110c are recorded in the temporary storage unit 110.

Note that, when the head 40 has moved to the servo frame D and read the position information and fourth correction value information in the servo frame D, the fourth correction value information is stored in the temporary storage unit 110, and the first correction value information is deleted. In other words, every time new correction value information is inputted to the temporary storage unit 110, the oldest correction value information is deleted from the temporary storage unit 110.

The correction information processing unit 120 (see FIG. 5) judges whether the correction value information recorded in the temporary storage unit 110 should be used for correcting the position information. The correction information processing unit 120 includes a correction information checking unit 120a, a difference calculation processing unit 120b, and a judgment processing unit 120c.

The correction information checking unit 120a uses parity information or the like included in the respective correction value information to check whether the respective pieces of correction value information stored in the temporary storage unit 110 have been read correctly.

The difference calculation processing unit 120b calculates an absolute value of a difference between a correction value in correction value information corresponding to certain position information and a correction value in the immediately preceding correction value information, and judges whether the absolute value has exceeded a predetermined threshold value. More specifically, when correction value information corresponding to the position information to be corrected is the second correction value information, the difference calculation processing unit 120b calculates an absolute value of a difference between the correction value C2 and the correction value C1.

If the correction information checking unit 120a judges that the respective pieces of correction value information stored in the temporary storage unit 110 have been read correctly, and if the difference calculation processing unit 120b judges that the absolute value of the difference has not exceeded the predetermined threshold value, then the judgment processing unit 120c judges whether the correction value information stored in the temporary storage unit 110 should be used for correcting the position information.

More specifically, the correction value information for correcting the position information stored in the servo frame C is the second correction value information. Therefore, the judgment processing unit 120c uses the first correction value information and the third correction value information, which are pieces of correction value information recorded in servo frames before and after the second correction value information, to judge whether the second correction value information should be used.

Note that, to perform the judgment, the judgment processing unit 120c adds the correction value C1 and the difference D1 to obtain a confirmation value CA. If the confirmation value CA and the correction value C2 match, the judgment processing unit 120c judges that the second correction value information should be used for correcting the position information.

However, if the confirmation value CA and the correction value C2 do not match, the judgment processing unit 120c subtracts the difference D2 from the correction value C2 to obtain a confirmation value CC. Then, if the confirmation value CC and the confirmation value CA match, or if the confirmation value CC and the correction value C2 match, the judgment processing unit 120c judges that the second correction value information should be used for correcting the position information.

Figure 5:
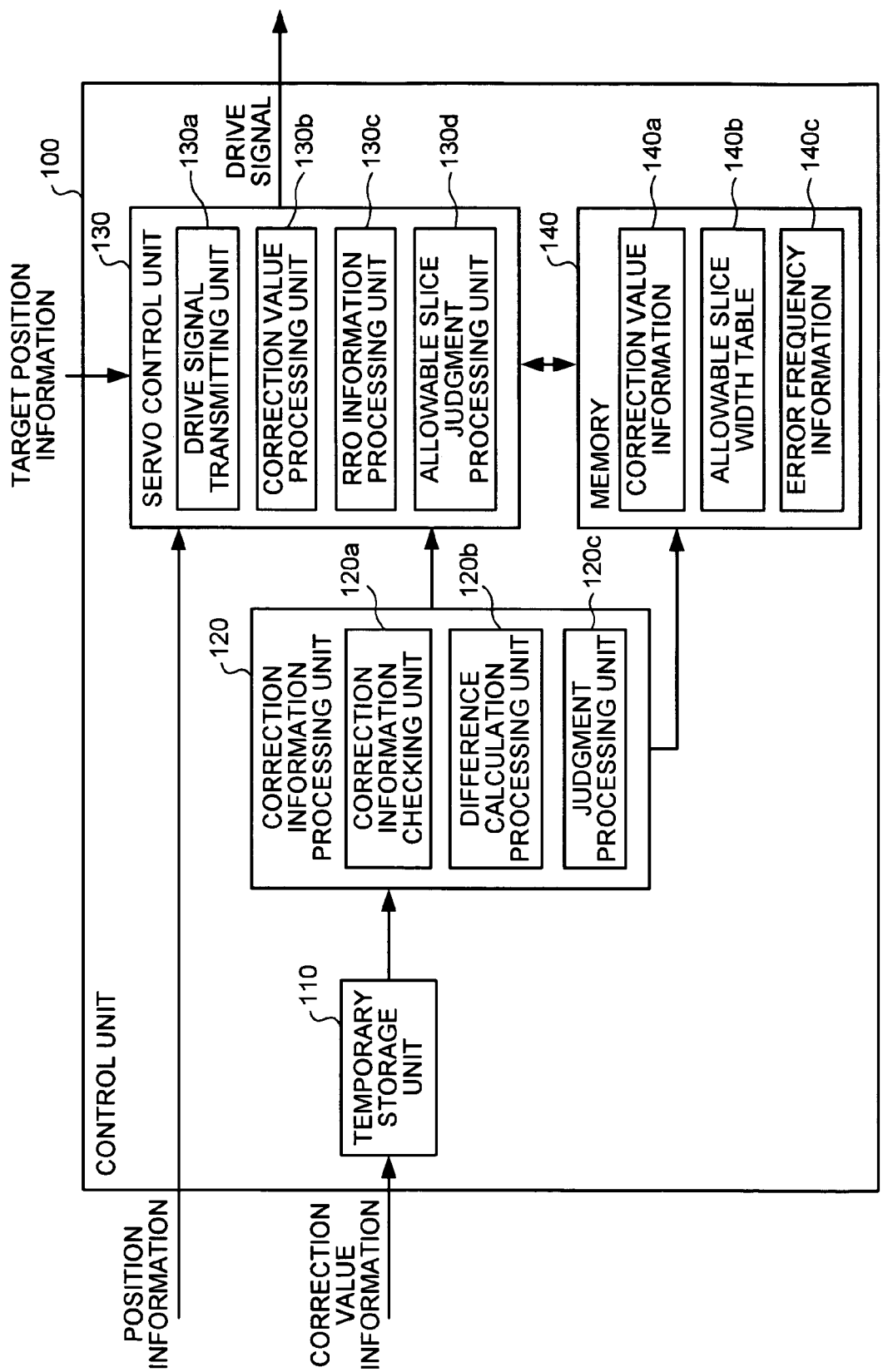
FIG. 5 is a functional block diagram of a structure of a control unit shown in FIG. 1.

If it is judged that the second correction value information should be used for correcting the position information, the judgment processing unit 120c sends the correction value C2 included in the second correction value information to the servo control unit 130 (see FIG. 5). In addition, the judgment processing unit 120c stores the second correction value information and the position information for the servo frame C, in a correction value information 140a of the memory 140, in association with each other.

However, if it is judged that the second correction value information should not be used for correcting the position information, the judgment processing unit 120c informs the servo control unit 130 that an error has occurred.

The servo control unit 130 outputs a drive signal that causes the head 40 to follow a target track center. The servo control unit 130 includes a drive signal transmitting unit 130a, a correction value processing unit 130b, an RRO information processing unit 130c, and an allowable slice judgment processing unit 130d.

In order to cause the head 40 to follow a track corresponding to the target position information, the drive signal transmitting unit 130a sends a drive signal to the D/A conversion unit 10, to thereby eliminate an error between the target position information and corrected position information.

The correction value processing unit 130b uses the correction value received from the correction information processing unit 120, to correct the position information to be sent by the decoding unit 70, and passes the corrected position information to the drive signal transmitting unit 130a.

However, if an error is notified by the correction information processing unit 120, the correction value processing unit 130b searches correction value information corresponding to the position information in the correction value information 140a of the memory 140. If the correction value information corresponding to the position information is present in the correction value information 140a, then the correction value processing unit 130b uses the correction value included in the correction value information to correct the position information, and passes the corrected position information to the drive signal transmitting unit 130a.

However, if the correction value information corresponding to the position information is not present in the correction value information 140a, the correction value processing unit 130b informs the RRO information processing unit 130c that the correction value information is not present.

Moreover, when the correction value processing unit 130b sends the corrected position information to the drive signal transmitting unit 130a, the correction value processing unit 130b resets a continuous error frequency, which is stored in an error frequency information 140c, to an initial value zero. On the other hand, if the correction value processing unit 130b informs the RRO information processing unit 130c that the corrected position information is not present, then the correction value processing unit 130b increments the error frequency by one.

If the RRO information processing unit 130c is informed by the correction value processing unit 130 that the correction value information is not present, the RRO information processing unit 130c sends target position information for RRO data for one round of track, which corresponds to the position information, to the drive signal transmitting unit 130a. Then, the RRO information processing unit 130c receives RRO data via the head 40, and stores the received RRO data in the correction value information 140a.

Note that, when the drive signal transmitting unit 130a receives the target position information for the RRO data, the drive signal transmitting unit 130a sends a drive signal, for moving the head 40 to a position of target RRO data, to the D/A conversion unit 10. Then, the drive signal transmitting unit 130a sends a drive signal, for resetting the head 40 to an original track position, to the D/A conversion unit 10.

The allowable slice judgment processing unit 130d uses the continuous error frequency, which is recorded in the error frequency information 140c, and the allowable slide width table 140b, to specify an allowable slice width. Then, the allowable slice judgment processing unit 130d judges whether a writing operation is allowed based on the specified allowable slice width and the position information. If it is judged that the writing operation is not allowed, the allowable slice judgment processing unit 130 prohibits writing of data by the head 40.

FIG. 8 illustrates an example of the allowable slice width table 140b. The allowable slice width table 140b consists of an error frequency, and an allowable slice width that is specified with a track center in the middle. The error frequency 0 indicates that the allowable slice width is −15% to 15%. The error frequency 1 to 5 indicates that the allowable slice width is −10% to 10%. The error frequency 5 or more indicates that the allowable slice width is −5% to 5%.

Figure 9:
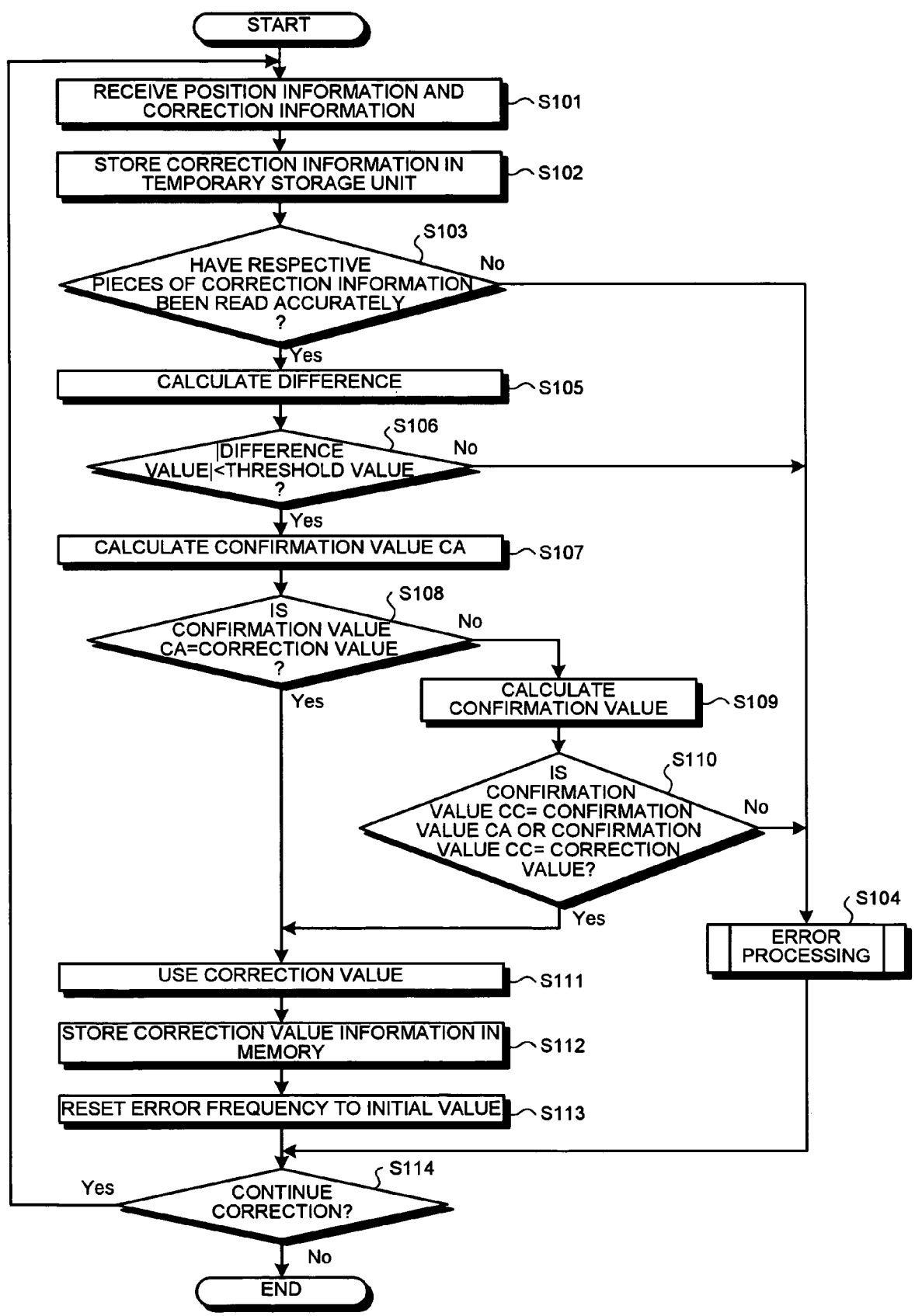
FIG. 9 is a flowchart a process procedure in which the control unit corrects position information.

A process procedure in which the control unit 100 corrects position information will be explained next, with reference to the flowchart in FIG. 9. The control unit 100 receives position information and correction value information (step S101), and the temporary storage unit 110 stores the correction value information (step S102).

Then, the correction information processing unit 120 judges whether respective pieces of correction value information have been read appropriately (step S103). If the respective pieces of correction value information have not been read appropriately (No at step S103), the correction information processing unit 120 performs error processing (step S104).

However, if the respective pieces of correction value information have been read appropriately (Yes at step S103), the correction information processing unit 120 calculates a difference value (step S105), and judges whether an absolute value of the calculated difference value is less than a threshold value (step S106).

If the absolute value of the difference value is not less than the threshold value (No at step S106), the control unit 100 executes the error processing at step S104. If the absolute value of the differential value is less than the threshold value (Yes at step S106), the correction information processing unit 120 calculates a confirmation value CA (step S107), and judges whether a correction value, which is included in correction value information corresponding to position information to be subject to correction, is equal to the confirmation value CA (step S108).

If the confirmation value CA and the correction value are not equal (No at step S108), the correction information processing unit 120 calculates a confirmation value CC (step S109), and judges whether the confirmation value CC is equal to the confirmation value CA or the correction value (step S110).

If the confirmation value CC does not match the confirmation value CA or the correction value (No at step S110), the control unit 100 performs the error processing at step S104. If the confirmation value CC is equal to the confirmation value CA or the correction value (Yes at step S110), the control unit 100 executes step S111.

On the other hand, if the confirmation value CA is equal to the correction value (Yes at step S108), the servo control unit 130 uses the correction value for correcting the position information (step S111). The correction information processing unit 120 causes the memory 140 to store the correction value information (step S112), and resets the error frequency of the error frequency information to the initial value (step S113).

The servo control unit 130 judges whether the correction should be continued (step S114). If the correction should be continued (Yes at step S114), the control unit 100 returns to step S101, and if the correction is not continued (No at step S114), the control unit 100 ends the process.

Figure 10:
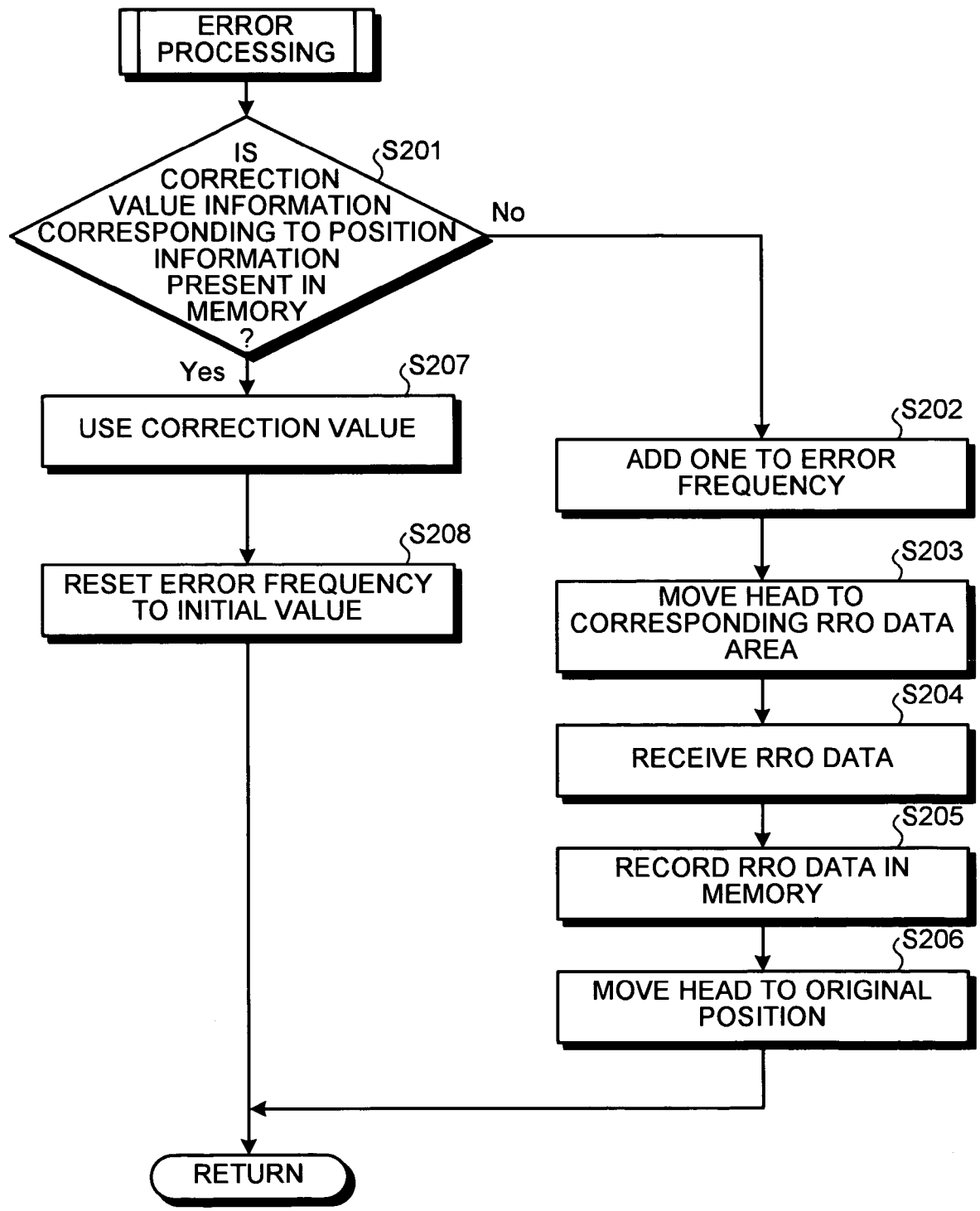
FIG. 10 is a flowchart of error processing.

A process procedure for the error processing indicated by step S104 in FIG. 9 will be explained next, with reference to the flowchart in FIG. 10. The servo control unit 130 judges whether correction value information corresponding to the position information is present in the memory 140 (step S201).

If correction value information corresponding to the position information is not present in the memory 140 (No at step S201), the servo control unit 130 adds one to the error frequency of the error frequency information 140c, moves the head 40 to a corresponding RRO data area (step S203), receives RRO data (step S204), causes the memory 140 to store the RRO data (step S205), and moves the head 40 to an original position (step S206).

On the other hand, if correction value information corresponding to the position information is present in the memory 140 (Yes at step S201), the servo control unit 130 uses the correction value included in the correction value information (step S207), and resets the error frequency of the error frequency information 140c to the initial value (step S208).

Thus, the correction information processing unit 120 judges whether correction position information is appropriate, and uses correction information. Consequently, accuracy of on-track control improves.

Figure 11:
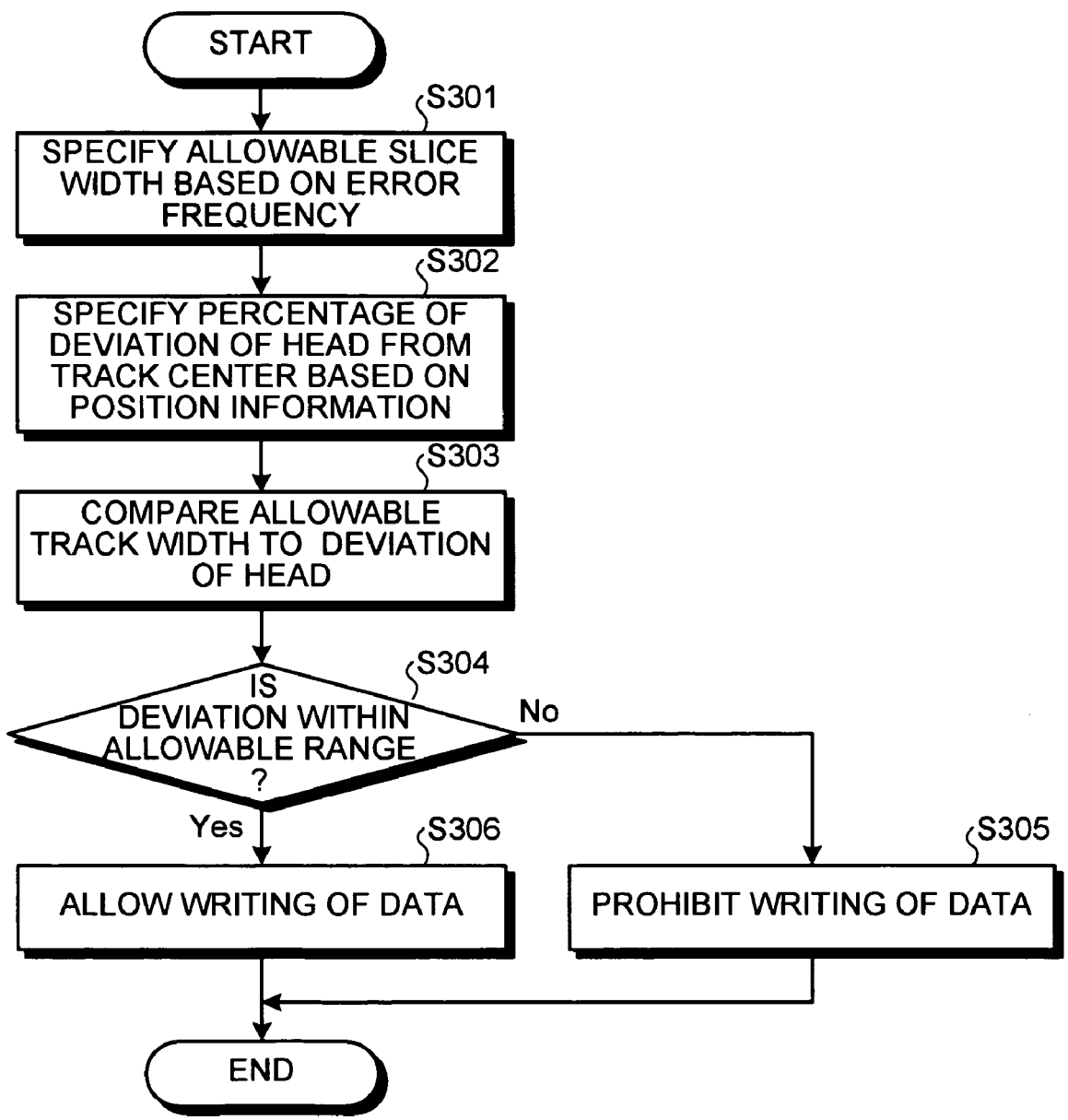
FIG. 11 is a flowchart of slice judgment that is performed by an allowable slice judgment processing unit.

A process procedure for slice judgment, which is performed by the allowable slice judgment processing unit 130d, will be explained next with reference to the flowchart in FIG. 11.

The allowable slice judgment processing unit 130d specifies an allowable slice width based on the error frequency of the error frequency information 140c, and the allowable slice width table 140b (step S301).

Then, the allowable slice judgment processing unit 130d specifies a percentage of deviation of a position of the head 40 from a position of the track center, based on the position information (step S302), compares an allowable track width to the deviation of the head 40 (step S303), and judges whether the deviation is within an allowable range (step S304).

If the deviation of the head 40 is not within the allowable range (No at step S304), the allowable slice judgment processing unit 130d prohibits writing of data (step S305). If the deviation of the head 40 is within the allowable range (Yes at step S304), the allowable slice judgment processing unit 130d allows writing of data (step S306).

As described above, in the disk device 200 according to this embodiment, the temporary storage unit 110 stores respective pieces of correction value information. If the correction value information stored in the temporary storage unit 110 is appropriate, the correction value information processing unit 120 uses a correction value included in the correction value information to correct the position information. In addition, if the correction value information stored in the temporary storage unit 110 is not appropriate, the correction value information processing unit 120 uses the correction value information stored in the memory 140 or the RRO data area to correct the position information. Thus, it is possible to correct the position information accurately, and improve the accuracy of on-track control of the head 40.

The allowable slice judgment processing unit 130d specifies deviation of the head 40 to be allowed based on a continuous error frequency, and if the deviation of the head 40 exceeds an allowable range, prohibits writing of data. Thus, even if correction information is not read appropriately, data destruction or the like is prevented.

Note that, in this embodiment, relations among correction values and differences, in which a value obtained by subtracting the correction value C2 from the correction value C1 is the difference D1, and a value obtained by subtracting the correction value C2 from the correction value C3 is the difference D2, are used to judge whether correction value information is appropriate. However, the correction values and the differences may be associated in any manner.

For example, a value obtained by subtracting the correction value C1 from the correction value C2 is the difference D2, and a value obtained by subtracting the correction value C2 from the correction value C3 is the difference D3. This relation may be used to judge whether correction value information is appropriate.

Even if it is judged that correction value information corresponding to the position information stored in the temporary storage unit 110 is not appropriate, an appropriate correction value may be calculated from pieces of correction value information recorded before and after the correction value information, and used for correcting the position information.

In this embodiment, relations among correction values and differences included in the correction value information are used to judge whether a correction value corresponding to position information (hereinafter "position information correction value") should be used. However, differences between the position information correction value and correction values included in servo frames recorded before and after the position information correction value can be used to judge whether a position information correction value should be used.

More specifically, correction values are generated in advance such that magnitudes of changes of the respective correction values are within a predetermined allowable range, and the generated correction values are recorded in respective servo frames in a disk. Then, a position information correction value and correction values recorded before and after the position information correction value are obtained from the respective servo frames, and differences between the position information correction value and the correction values recorded before and after the position information correction value are calculated.

If the calculated difference is within the predetermined allowable range, it is judged that the position information correction value should be used for correcting the position information. If the calculated difference has exceeded the predetermined allowable range, it is judged that the position information correction value should not be used for correcting the position information.

Thus, correction values, which are generated such that magnitudes of changes thereof are within a predetermined allowable range, are used to judge whether a position information correction value should be used based on only differences between the position information correction value and correction values recorded before and after the position information correction value. Thus, burden on a control unit reduces, and a position of a head is corrected efficiently.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A disk device that performs position control of a head, comprising:
   an acquiring unit that acquires correction information and check information from a disk for checking the correction information; and
   a judging unit that judges whether the correction information acquired should be used for correcting position information recorded in the disk, based on the correction information acquired and the check information acquired.

2. The disk device according to claim 1, further comprising:
   a preliminary correction information storing unit that stores the correction information in advance as preliminary correction information, wherein,
   if the judging unit judges that the correction information acquired should not be used for correcting the position information, then the position information is corrected based on the preliminary correction information stored.

3. The disk device according to claim 2, further comprising:
   a correction information storage processing unit that acquires correction information corresponding to the position information from the disk, and causes the preliminary correction information storing unit to store the correction information acquired, if the preliminary correction information corresponding to the position information is not present in the preliminary correction information storing unit.

4. The disk device according to claim 1, further comprising:
   a deviation specifying unit that specifies deviation of the head based on the position information; and
   a write prohibiting unit that prohibits writing of data in the disk.

5. The disk device according to claim 4, further comprising:
   a counting unit that counts the number of times the judging unit judges that the correction information should not be used for correcting the position information; and
   an allowable value changing unit that changes an allowable value based on the number of times counted by the counting unit.

6. A computer-readable recording medium that contains a computer program that includes instructions, which when executed on a computer, cause the computer to execute:
   acquiring correction information and check information from a disk for checking the correction information; and
   judging whether the correction information acquired should be used for correcting position information that is recorded in the disk, based on the correction information and the check information.

* * * * *